Figure 1:
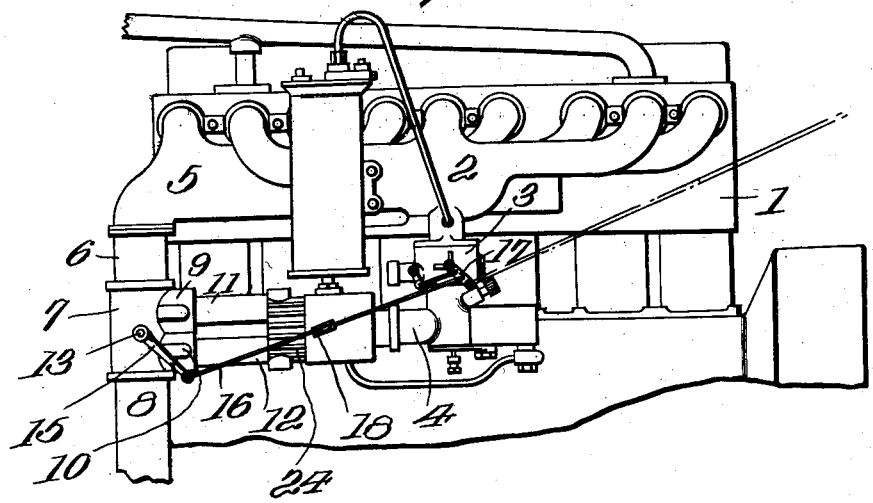

Nov. 22, 1927.

A. G. REDMOND 1,650,156

THROTTLE VALVE CONTROL AIR HEATER FOR CHARGE FORMING DEVICES

Filed Aug. 4, 1921

Inventor

A. G. Redmond.

By
Attorney

Patented Nov. 22, 1927.

1,650,156

UNITED STATES PATENT OFFICE.

ALBERT G. REDMOND, OF INDIANAPOLIS, INDIANA, ASSIGNOR TO MARVEL CARBURETER COMPANY, OF FLINT, MICHIGAN, A CORPORATION OF INDIANA.

THROTTLE-VALVE-CONTROL AIR HEATER FOR CHARGE-FORMING DEVICES.

Application filed August 4, 1921. Serial No. 489,820.

This invention relates to certain new and useful improvements in air heaters for charge forming devices used in connection with internal combustion engines and is a continuation in part of the invention disclosed in my application for air heater for charge forming devices filed December 15, 1919, Serial Number 344,931, the object being to provide means for controlling the application of heat by the movement of the throttle valve.

Another object of the invention is to provide a heater arranged at the inlet of the carbureter or charge forming device so as to heat the air entering the charge forming device by the exhaust gases, the valve controlling the application of exhaust gases to the heater being connected to the throttle valve of the charge forming device so that as the throttle valve is opened to increase the speed of the internal combustion engine to which the device is attached, the volume of exhaust gases delivered to the heater will be reduced.

Other and further objects and advantages of the invention will be hereinafter set forth and the novel features thereof defined by the appended claims.

Figure 2:
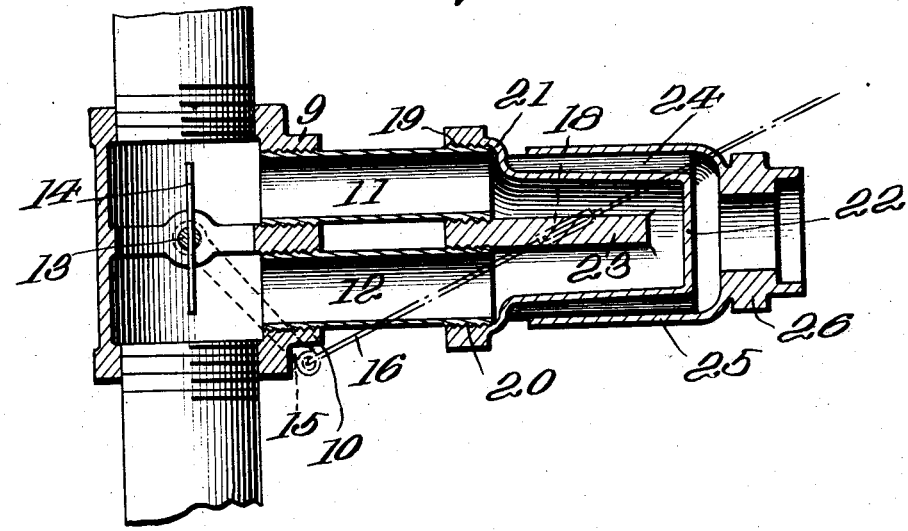

In the drawings,

Figure 1 is a side elevation of an internal combustion engine showing the heater in position and a connection between the exhaust valve and the throttle valve; and Figure 2 is an enlarged longitudinal section through the heater.

In carrying out my invention I show the application of the same to an internal combustion engine 1 which is provided with the usual intake manifold 2 having a charge forming device 3 connected thereto provided with an air inlet 4. The engine is provided with an exhaust manifold 5 of the ordinary construction now in use and the above description is given so that the operation of my improved construction of air heater will be readily understood.

Secured to the exhaust manifold 5 is an exhaust pipe 6 which in this instance is connected to a coupling member 7, from the opposite end of which extends an exhaust pipe 8 leading to the muffler. The coupling member 7 is provided with threaded nipples 9 and 10 having pipes 11 and 12 screwed therein.

A valve stem 13 extends transversely through the coupling member 7 carrying a valve 14 for closing the passage in order to divert the entire volume of exhaust gases delivered from the internal combustion engine out of its natural path of travel through the nipple 9 into the tube 11. One end of the valve stem 13 carries an arm 15 to which is connected a rod 16 for operating the same.

In my former application this rod extended to the dash for operating the same but in the construction herein shown, the throttle valve arm 17 of the carbureter or charge forming device is connected to the free end of the rod so that the valve 13 works in unison with the throttle valve, and as the throttle valve is opened, the valve 13 is opened so as to allow a portion of the exhaust gases to pass in a natural path of travel to the muffler.

The rod 17 is provided with a turnbuckle or adjustable connection 18 so that the relative positions of the valve 13 and throttle valve can be adjusted and while I have shown this means for accomplishing this result, I am aware that the arm 15 of the valve 13 and the throttle arm can be provided with a series of openings so that the ends of the rods can be connected in various openings in order to adjust the relative positions of the valves in respect to one another. The throttle valve arm is operated in the usual manner from the throttle control and as the throttle valve opens and closes, the valve in the exhaust line opens and closes.

A casting 21 provided with openings 19 and 20 is arranged at the ends of the pipes 11 and 12, which pipes are secured therein by any suitable means and said casting is preferably tubular in shape having a closed end 22 and provided with a longitudinally disposed partition 23 which terminates short of the closed end 22 in order to cause the exhaust gases entering the opening 19 to pass around the end of the partition and out of the opening 20 and into the pipe 12 and back into the exhaust line to the other side of the valve in the exhaust pipe. This provides means for applying the heat at a point adjacent the intake of the charge forming device or carbureter so as to heat the air quickly as will be later described.

The tubular casting 21 forming the heater proper is provided with external longitudinally disposed fins or ribs 24, over which is arranged a shell 25 provided with a coupling portion 26 adapted to be connected to the air intake 4 of the charge forming device, the shell 25 terminating short of the enlarged portion of the casting 21 in order to allow the air to pass into the air passageways formed by the fins and shell. By this construction it will be seen that a plurality of air passages are formed by the fins and shell in order to heat quickly the air sucked into the charge forming device through the air intake.

From the foregoing description it will be seen that I have provided an air heater disposed within the air intake of a charge forming device of such a construction that the entire volume of gases discharged from the internal combustion engine are carried through the heater so as to heat the same quickly in order to heat the air delivered to the charge forming device in connection with means for controlling the position of the valve within the exhaust pipe by the movement of the throttle so as the speed of the engine increases, the application of heat to the heater is decreased.

In the operation of the heater as herein shown, assuming that the valve and coupling member 7 of the exhaust pipe is in closed position and the throttle of the charge forming device is in its usual closed position in starting an internal combustion engine, the entire volume of gases from the internal combustion engine passes through the heater, which by its location and by the particular construction of heater, heats the air passing into the charge forming device very quickly and as the motor warms up, the speed is increased and by the opening of the throttle the valve 13 is gradually opened so as to reduce the volume of gases passing into the heater.

While in this application I have shown a connection between the throttle and valve of the exhaust line so that when the throttle is opened and closed the two valves work in unison, I am aware that a construction can be used which will allow the valve 13 to be moved independent of the position of the throttle so that in starting the motor, the valve can be held closed until the motor has become warm and then the valve can be allowed to move in unison with the throttle valve so that the application of the heat to the heater will be controlled by the movement of the throttle valve.

What I claim is:—

1. The combination with an internal combustion engine having an intake manifold, exhaust manifold and exhaust pipe connected thereto, of a charge forming device connected to the intake manifold provided with an air inlet and a throttle valve, an air heater disposed in said air inlet, a valve casing disposed in the exhaust line, said casing being provided with an outlet and an inlet, pipes connecting said heater to the outlet and inlet of said valve casing to each side of said valve and a connection between said valve and throttle valve for controlling the passage of exhaust gases passing through said heater.

2. The combination with an internal combustion engine having an intake manifold, exhaust manifold and an exhaust pipe connected thereto spaced from the intake manifold, of a charge forming device connected to the intake manifold provided with a lateral air inlet and a throttle valve for controlling the passage of explosive charge therethrough, a valve casing disposed in said exhaust pipe provided with a lateral inlet and outlet, an air heater disposed between the air inlet of the charge forming device and said outlet and inlet, pipes connecting said outlet and inlet to said air heater and a valve disposed in said valve casing between said inlet and outlet having a connection with said throttle valve for causing the exhaust gases to pass through said air heater.

In testimony whereof I hereunto affix my signature.

ALBERT G. REDMOND.